United States Patent [19]

Cramer

[11] 4,031,748

[45] June 28, 1977

[54] VORTEX FLOW PARTICLE ACCELERATOR

[75] Inventor: Kenneth R. Cramer, Dayton, Ohio

[73] Assignee: The United States of America as represented by the Secretary of the Air Force, Washington, D.C.

[22] Filed: May 11, 1976

[21] Appl. No.: 685,247

[52] U.S. Cl. .................................................. 73/147

[51] Int. Cl.² .......................................... G01M 9/00

[58] Field of Search .......................... 73/147; 51/11

[56] References Cited

UNITED STATES PATENTS

| | | | |
|---|---|---|---|
| 2,532,655 | 12/1950 | Backer | 51/11 X |
| 2,801,133 | 7/1957 | Ridley | 51/11 X |

*Primary Examiner*—Richard C. Queisser

*Assistant Examiner*—Joseph W. Roskos

*Attorney, Agent, or Firm*—Joseph E. Rusz; Richard J. Killoren

[57] ABSTRACT

A particle accelerator having a tapered tubular vortex flow channel with a zero taper entrance portion. A high pressure low molecular weight gas, such as helium or hydrogen, is supplied tangentially into the zero taper portion of the flow channel. The particles to be accelerated are also supplied into the zero taper portion of the flow channel. An axial gas exit is provided at the end of the flow channel remote from the gas inlet. A tangential particle exit tube is tilted in the direction of flow at an angle of approximately 60 degrees with respect to the longitudinal axis of the flow channel.

4 Claims, 3 Drawing Figures

VORTEX FLOW PARTICLE ACCELERATOR

RIGHTS OF THE GOVERNMENT

The invention described herein may be manufactured and used by or for the Government of the United States for all governmental purposes without the payment of any royalty.

BACKGROUND OF THE INVENTION

This invention relates to a particle acceleration system. Prior art systems used for accelerating particles are described in the U.S. Pat. Nos. to Johnson et al, 3,739,634 and Johnson et al, 3,893,335. To provide high velocity particles, relatively long flow interaction paths are required. For some applications, space limitations prohibit the use of long flow interaction regions. In a conventional centrifugal accelerator, the particles are thrown toward the wall of the accelerator into the boundary layer where there is a momentum loss due to friction in the boundary layer adjacent the wall. Compensation for these losses has been provided by multiple acceleration nozzles. Large radius channels are required, however, to provide a long single pass interactor path.

BRIEF SUMMARY OF THE INVENTION

According to this invention, a particle accelerator is provided which has a long flow interaction region in a very short length particle accelerator. A vortex flow of low molecular weight gas is established in a tapered tubular member wherein the particles to be accelerated are added to the established vortex flow. By establishing the vortex flow in a chamber which is tapered toward the exit flow, the flow through the chamber occurs as a secondary flow through the boundary. Since the velocity of the gas increases as the radius decreases, this replenishes the momentum lost by friction in the boundary layer. The boundary layer becomes very thin toward the exit port. The particles which are accelerated toward the wall will be accelerated more efficiently in the tapered chamber since they will remain in the high gas velocity region. Thus, since the particles and gas make many passes around the circumference of the tapered chamber before reaching the exit, a very long flow interaction distance is provided. The particle exit port is tangential to the wall and located in the direction of flow at an angle of about 60 degrees to the longitudinal axis of the flow chamber to provide exit of the particles along the maximum flow velocity vector.

IN THE DRAWING

DETAILED DESCRIPTION OF THE INVENTION

Figure 1:
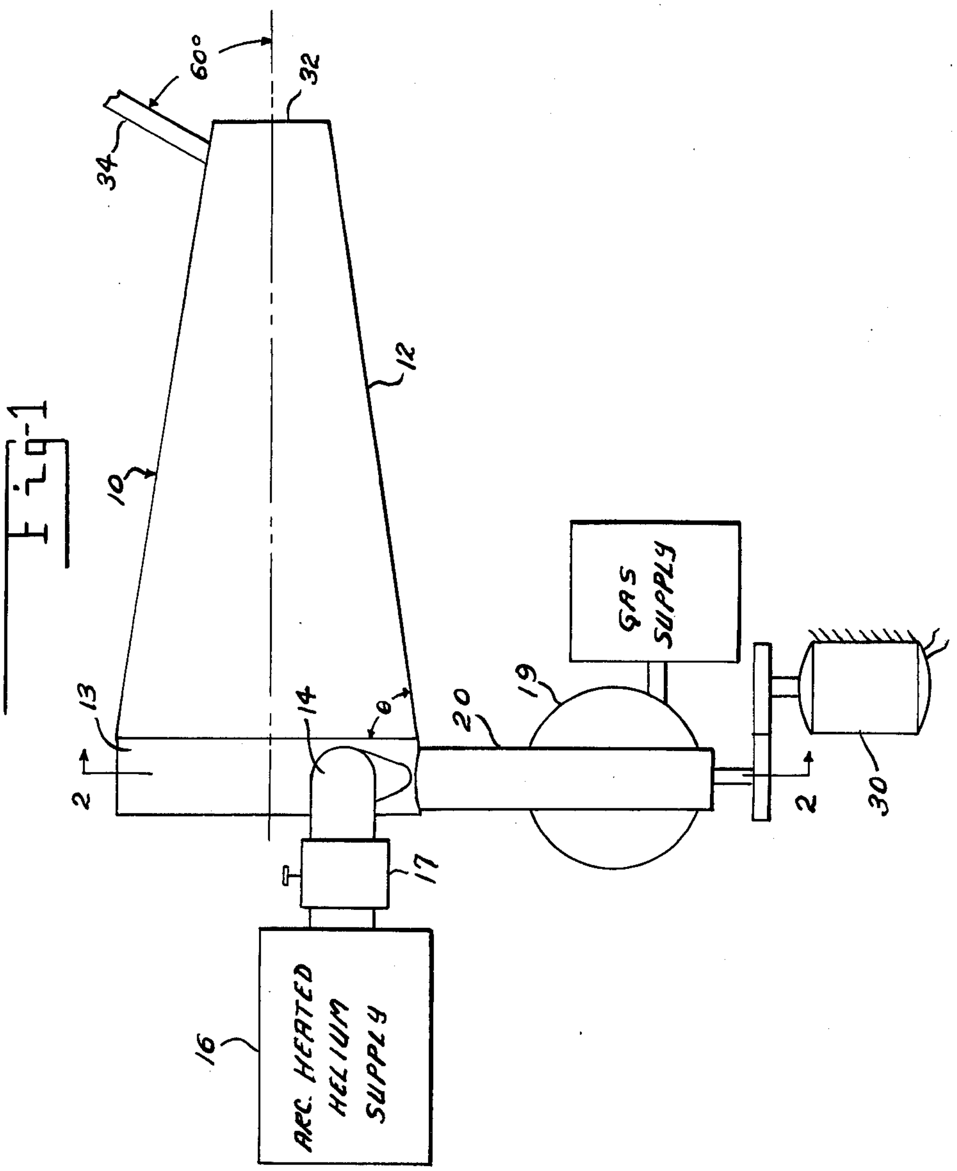
FIG. 1 is a partially schematic side view of a particle accelerator according to the invention.
Figure 2:
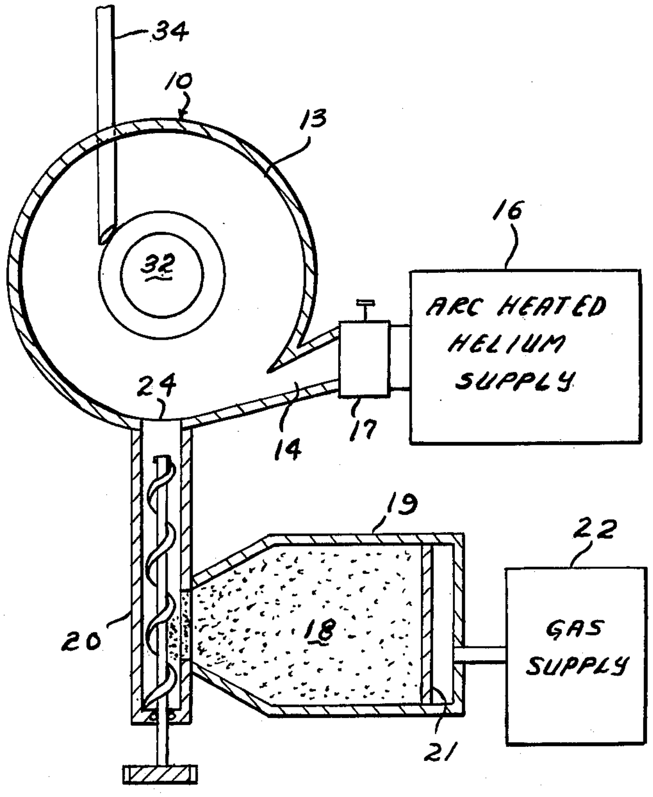
FIG. 2 is a partially schematic sectional view of the device of FIG. 1 along the line 2—2.

Reference is now made to FIGS. 1 and 2 of the drawing which shows a particle accelerator 10 having a frusto conical shaped flow chamber 12 with a zero taper inlet region 13 and a gas inlet 14. A high pressure gas, such as helium or hydrogen at 100 atmospheres, is supplied from supply 16, through control valve 17 and through gas inlet 14 to the region 13 of chamber 12.

The particles 18, to be accelerated are held in a container 19 which supplies the particles to worm conveyor 20. The particles are fed into the zero taper portion 13 of the flow chamber 12 from by the conveyor 20 driven by motor 30. Piston 21 driven by gas from supply 22 moves the particles toward conveyor 20. Other means than that shown may be used to supply particles to the chamber 12.

The particular particles used as well as the particle size would be determined by the particular application. The particle sizes could be submicron sizes or could be as large as 1000 microns depending upon the particular application. Examples of particles that might be used are dust particles, carbon particles, magnesium oxide particles, hafnium oxide particles or aluminum oxide particles. However, it is to be understood that the apparatus is not limited to the use of these particles as many other types of particles could be used. A gas exit port 32 is provided at the end of chamber 12 remote from gas inlet 14. The port 32 is less than 1/2 the diameter of region 13 but greater than the diameter of the gas inlet 14. A particle exit tube 34 is positioned so that the particles leave the chamber 12 approximately tangential to the chamber wall. The exit tube is tilted forward in the direction of flow at an angle approximately equal to 60° with respect to the longitudinal axis of the flow chamber 12, so that the particles will leave the chamber approximately along the maximum velocity vector. The initial portion of the chamber 12 has zero taper so that the gas and particles can make a number of circumferential passes before entering the taper region which increases the total interaction path length. The taper angle $\theta$ for the flow channel 12 will normally be between 65° and 86° to provide adequate interaction lengths and adequate boundary layer regeneration.

According to one apparatus design, the angle $\theta$ is approximately 81.5° with a diameter of inlet region 13 being 8 inches and the overall flow chamber length of 14 inches.

In the operation of the device of the invention, valve 17 is opened to admit high pressure gas from supply 16 to the flow chamber 12. After a short time, the vortex flow will be established within chamber 12 and the motor 30 is started to admit the solid particles into chamber 12 adjacent to the inlet 14. Interaction between the particles and vortex flow will accelerate the particles. As the gas flows in chamber 12, the particles are centrifuged toward the boundary layer near the wall which is normally a high loss region. Since the vortex velocity increases as the radius decreases, the momentum loss in the boundary layer due to friction is compensated by the increased flow velocity due to the decrease in radius. Thus, the particles will be accelerated efficiently since they will remain in the high velocity gas region. The gas exit port 32 allows the gas core of the vortex to exit where there are few particles in the flow. The particles leave the chamber through tube 34.

Figure 3:
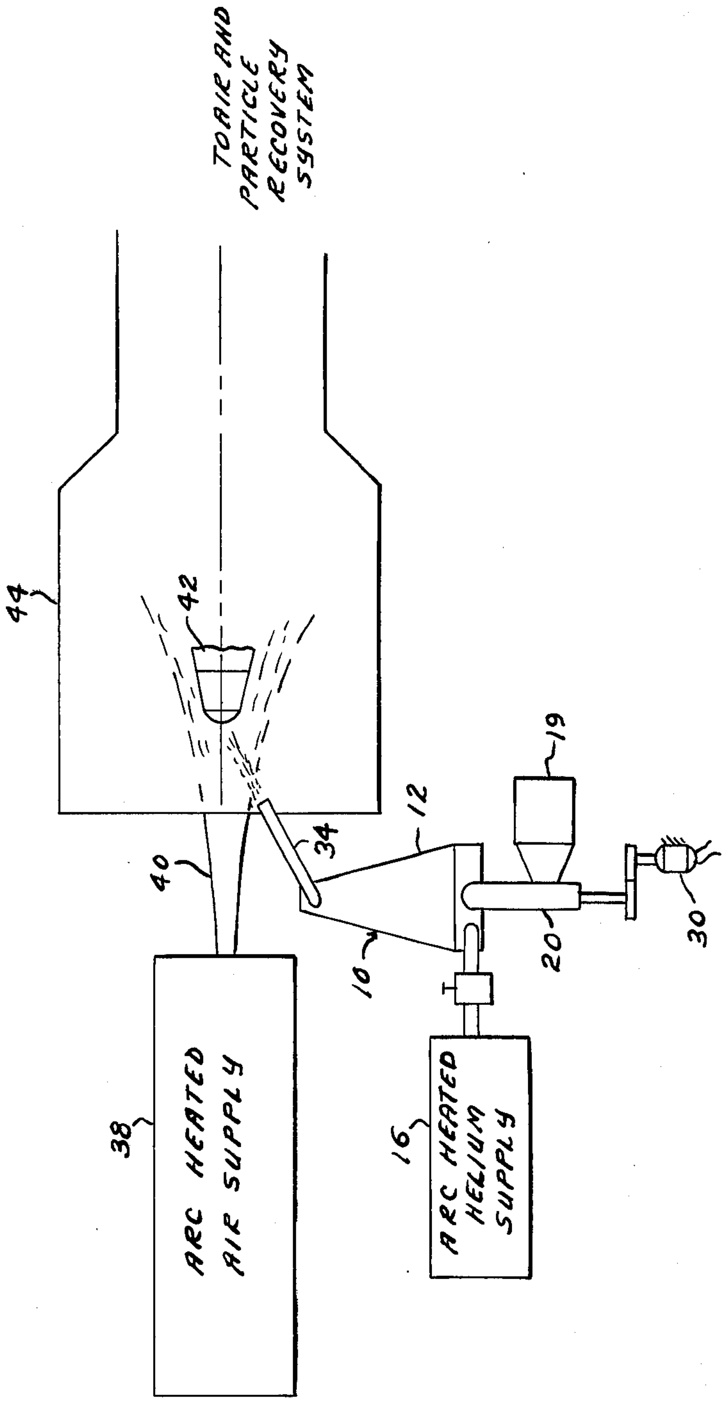
FIG. 3 is a schematic illustration showing the particle accelerator of FIGS. 1 and 2 used in a test apparatus.

The device of FIG. 3 shows one application for the particular accelerator of FIGS. 1 and 2. Arc heated air from supply 38 is expanded to a high velocity in nozzle 40 and directed toward test model 42 in a conventional manner. Solid particles from particle accelerator 10 and a velocity between 15,000 and 20,000 ft/sec are also directed toward the test model 42. For a normal 30 second run of 2.5 gm/sec of particles, a total of about 75 gm of particles will be used. The air and particles leaving the test section 44 will pass to a normal particle and air recovery system, not shown.

There is thus provided a particle accelerator for providing high velocity particles in a very short axial length system.

I claim:

1. A particle accelerator comprising: a substantially frusto conically shaped flow chamber; said flow chamber having a zero taper entrance portion at the larger end of said flow chamber; an axial exit at the end of said flow chamber remote from said zero taper section; means for supplying a high pressure low molecular weight gas tangentially to the zero taper section of said flow chamber to thereby provide a vortex gas flow within said flow chamber; means for supplying small solid particles into the gas flow within said flow chamber at the zero taper section of said flow chamber and means for removing said particles from said chamber substantially along the maximum flow velocity vector of said particles within said flow chamber.

2. The device as recited in claim 1 wherein said low molecular weight gas is helium.

3. The device as recited in claim 2 wherein said means for removing said particles from said chamber includes a tengential particle exit tube connected to said flow chamber at the end near said gas exit; said exit tube extending in the direction of flow through said chamber at an angle of approximately 60 degrees with respect to the longitudinal axis of the flow chamber.

4. The method of accelerating small solid particles to a high velocity, comprising: establishing a vortex flow of low molecular weight gas from the larger end to the smaller end of a frusto shaped chamber; supplying the small solid particles to the vortex flow in the larger end of the frusto conical shaped chamber; removing the gas axially at the smaller end of said chamber; removing the particles from said chamber substantially along the maximum flow velocity vector of the particles within said chamber.

* * * * *

UNITED STATES PATENT OFFICE
CERTIFICATE OF CORRECTION

PATENT NO. : 4,031,748

DATED : June 28, 1977

INVENTOR(S) : Kenneth R. Cramer

It is certified that error appears in the above-identified patent and that said Letters Patent are hereby corrected as shown below:

Column 4, line 13, after "frusto" insert --- conical ---.

Signed and Sealed this

*Sixth* Day of *December 1977*

[SEAL]

*Attest:*

RUTH C. MASON
*Attesting Officer*

LUTRELLE F. PARKER
*Acting Commissioner of Patents and Trademarks*